US011348316B2

(12) United States Patent
Burns et al.

(10) Patent No.: US 11,348,316 B2
(45) Date of Patent: May 31, 2022

(54) LOCATION-BASED VIRTUAL ELEMENT MODALITY IN THREE-DIMENSIONAL CONTENT

(71) Applicant: Apple Inc., Cupertino, CA (US)

(72) Inventors: Aaron M. Burns, Sunnyvale, CA (US); Bruno M. Sommer, Sunnyvale, CA (US); Timothy R. Oriol, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/549,483

(22) Filed: Aug. 23, 2019

(65) Prior Publication Data

US 2020/0082632 A1 Mar. 12, 2020

Related U.S. Application Data

(60) Provisional application No. 62/729,671, filed on Sep. 11, 2018.

(51) Int. Cl.
*G06T 19/00* (2011.01)
*G06T 19/20* (2011.01)
*G02B 27/01* (2006.01)

(52) U.S. Cl.
CPC ........ *G06T 19/006* (2013.01); *G02B 27/0172* (2013.01); *G06T 19/20* (2013.01);
(Continued)

(58) Field of Classification Search
CPC .................. G06T 19/006; G06T 19/20; G06T 2219/2004; G06T 2219/2024;
(Continued)

(56) References Cited

U.S. PATENT DOCUMENTS 9,292,085 B2 3/2016 Bennett et al.
2012/0249741 A1* 10/2012 Maciocci .............. G06T 15/503
348/46
(Continued)

FOREIGN PATENT DOCUMENTS

EP 2887322 A1 6/2015
WO 2016/203792 A1 12/2016

OTHER PUBLICATIONS

Boland, XR Talks: Will Pass-through Video Outshine See-through Optics?, 2019, available at https://arinsider.co/2019/04/26/xr-talks-will-video-pass-through-leapfrog-optical-waveguides/ (Year: 2019).*
(Continued)

*Primary Examiner* — Phong X Nguyen
(74) *Attorney, Agent, or Firm* — Thompson Hine LLP

(57) ABSTRACT

Various implementations disclosed herein include devices, systems, and methods that enable a device to provide a view of virtual elements and a physical environment where the presentation of the virtual elements is based on positioning relative to the physical environment. In one example, a device is configured to detect a change in positioning of a virtual element, for example, when a virtual element is added, moved, or the physical environment around the virtual element is changed. The location of the virtual element in the physical environment is used to detect an attribute of the physical environment upon which the presentation of the virtual element depends. Thus, the device is further configured to detect an attribute (e.g., surface, table, mid-air, etc.) of the physical environment based on the placement of the virtual element and present the virtual element based on the detected attribute.

24 Claims, 9 Drawing Sheets

(52) U.S. Cl.
    CPC ............. *G02B 2027/014* (2013.01); *G02B 2027/0138* (2013.01); *G06T 2219/2004* (2013.01)

(58) Field of Classification Search
    CPC .......... G02B 27/0172; G02B 2027/014; G02B 2027/0138; G06F 3/04815; G06F 3/011; G06F 2203/012; G06F 2203/04802
    See application file for complete search history.

(56) References Cited

U.S. PATENT DOCUMENTS

| | | | |
|---|---|---|---|
| 2013/0044128 A1* | 2/2013 | Liu | G06T 19/006 345/633 |
| 2013/0286004 A1* | 10/2013 | McCulloch | G06T 19/006 345/419 |
| 2013/0342568 A1* | 12/2013 | Ambrus | G06T 19/006 345/633 |
| 2014/0002444 A1* | 1/2014 | Bennett | G06F 3/0304 345/419 |
| 2014/0066209 A1 | 3/2014 | Annambhotla | |
| 2014/0267228 A1 | 9/2014 | Ofek et al. | |
| 2014/0267404 A1* | 9/2014 | Mitchell | G06T 19/006 345/633 |
| 2014/0320389 A1* | 10/2014 | Scavezze | G06K 9/6267 345/156 |
| 2014/0333666 A1* | 11/2014 | Poulos | G06F 3/147 345/633 |
| 2016/0104452 A1* | 4/2016 | Guan | G06T 19/006 345/633 |
| 2016/0189426 A1* | 6/2016 | Thomas | G06F 3/011 345/633 |
| 2016/0217612 A1* | 7/2016 | Petill | G06T 3/40 |
| 2016/0239080 A1 | 8/2016 | Marcolina et al. | |
| 2016/0274762 A1* | 9/2016 | Lopez | G06T 19/006 |
| 2017/0236332 A1 | 8/2017 | Kipman et al. | |
| 2017/0287218 A1* | 10/2017 | Nuernberger | G06T 19/20 |
| 2018/0045963 A1* | 2/2018 | Hoover | G02B 27/0172 |
| 2018/0095616 A1* | 4/2018 | Valdivia | G06F 3/013 |
| 2018/0095624 A1* | 4/2018 | Osman | G06F 3/0484 |
| 2018/0096528 A1* | 4/2018 | Needham | G06T 7/70 |
| 2018/0157398 A1* | 6/2018 | Kaehler | G06F 3/017 |
| 2018/0174366 A1* | 6/2018 | Nishibe | G06F 3/04842 |
| 2018/0181199 A1* | 6/2018 | Harvey | G06F 3/014 |
| 2018/0190024 A1* | 7/2018 | Dugan | G06T 19/006 |
| 2018/0286126 A1* | 10/2018 | Schwarz | G06F 3/04845 |
| 2018/0307303 A1* | 10/2018 | Powderly | G06F 1/163 |
| 2018/0315248 A1* | 11/2018 | Bastov | G06T 19/006 |
| 2019/0050062 A1* | 2/2019 | Chen | G06T 7/70 |
| 2019/0139320 A1* | 5/2019 | Davies | G06F 3/02 |
| 2019/0188895 A1* | 6/2019 | Miller, IV | G06F 3/011 |
| 2019/0221043 A1* | 7/2019 | Kopper | G06F 3/014 |
| 2019/0244426 A1* | 8/2019 | Knoppert | G06T 19/20 |
| 2019/0333275 A1* | 10/2019 | Wang | G06T 19/006 |
| 2019/0369742 A1* | 12/2019 | Ghazanfari | G06V 40/28 |
| 2020/0150750 A1* | 5/2020 | Suzuki | G06F 3/017 |

OTHER PUBLICATIONS

European Patent Office, Partial European Search Report and Provisional Opinion Accompanying the Partial Search Result, European Patent Application No. 19196073.1, 19 pages, dated Jan. 8, 2020.
Nuernberger, B. et al., "Snap to Reality: Aligning Augmented Reality to the Real World", Augmented AR and VR Experiences, CHI '16, San Jose, CA, pp. 1233-1244, May 2016.
Jacobs, K. et al., "Classification of Illumination Methods for Mixed Realty," Computer Graphics Forum, vol. 25, No. 1, pp. 29-51, 2006.
European Patent Office, Extended European Search Report and Opinion, European Patent Application No. 19196073.1, 21 pages, Mar. 24, 2020.
Chen, L. et al., "Context-Aware Mixed Reality: A Framework for Ubiquitous Interaction," arxiv.org, Cornell University Library, Ithaca, NY, 11 pages, 2018.
Salas-Moreno, R.F. et al., "Dense Planar SLAM," 8 pages, 2014.
Japanese Patent Office, Notification of Reason(s) for Refusal, Japanese Patent Application No. 2019-154788, 9 pages (dated Oct. 15, 2020).
Korean Intellectual Property Office, Notice of Preliminary Rejection (with English translation), Korean Patent Application No. 10-2019-0110594, 11 pages (dated Jul. 31, 2020).
Korean Intellectual Property Office, Notice of Last Preliminary Rejection (with English translation), Korean Patent Application No. 10-2019-0110594, 12 pages (dated Mar. 31, 2021).
Japanese Patent Office, Decision for Refusal (with English translation), Japanese Patent Application No. 2019-154788, 8 pages (dated Apr. 8, 2021).
"Integrations. What are the ArtPlacer Widgets," by ArtPlacer Admin, 9 pages, Apr. 1, 2020 https://www.artplacer.com/what-are-the-artplacer-widgets/.
Strange, A., "Hands-On Magic Leap's Create App Is a Powerful Way to Invent Your Own Reality Nearly Anywhere," 11 p. Aug. 17, 2018 https://magic-leap.reality.news/news/hands-on-magic-leaps-create-app-is-powerful-way-invent-your-own-reality-nearly-anywhere-0186582/.

* cited by examiner

LOCATION-BASED VIRTUAL ELEMENT MODALITY IN THREE-DIMENSIONAL CONTENT

CROSS-REFERENCE TO RELATED APPLICATION

This Application claims the benefit of U.S. Provisional Application Ser. No. 62/729,671 filed Sep. 11, 2018, which is incorporated herein in its entirety.

TECHNICAL FIELD

The present disclosure generally relates to the display of computer-generated reality (CGR) environments, and in particular, to systems, methods, and devices for displaying virtual elements in three dimensional (3D) content where the virtual elements in the content change modality.

BACKGROUND

Various devices are used to provide users with computer-generated reality (CGR) environments. The 3D content of such experiences may be experienced by a user using a mobile device, head-mounted device ("HMD"), or other device that presents the visual or audio features of the content. The experience can be, but need not be, immersive, e.g., providing most or all of the visual or audio content experienced by the user. The content can include pass-through video (e.g., in which real-world content is captured by a camera and displayed on a display with additional content) or optical-see-through (e.g., in which real-world content is viewed directly or through glass and supplemented with displayed additional content).

Some devices and software programs facilitate the display of 3D content that includes virtual objects/elements. However, these devices and software programs do not provide sufficient features for adapting or tailoring the modalities of such virtual objects/elements.

SUMMARY

Various implementations disclosed herein include devices, systems, and methods that enable a device to present a view of virtual elements and a physical environment where the presentation of the virtual element is based on an attribute of the physical environment at the location of the virtual element in the view. In one example, a device is configured to detect a change in the view, for example, when a virtual element is placed at a location in the view relative to the physical environment and the location of the virtual element in the view is used to detect an attribute of the physical environment. Thus, the device is further configured to detect the attribute (e.g., surface, table, etc.) of the physical environment based on the placement of the virtual element and present the virtual element based on the detected attribute.

Some implementations, as illustrated in the above example and elsewhere herein, thus enable the presentation of a virtual element based on the location of the virtual element relative to an attribute of the physical environment. Creators of virtual elements, including creator of apps that include virtual elements, are able to provide views of virtual elements that have appearances, functions, and interactive features that adapt in the representation of the physical environment in which they are used. The end user experience using of a view that includes such adaptive virtual elements can be significantly better. The end user is able to see a view of virtual elements that are presented based upon the virtual elements' positions relative to the physical environment and may have significant freedom to move virtual elements around to experience the virtual elements in their different presentations.

In some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In some implementations, the methods described herein are performed at a device having one or more processors and a computer-readable storage medium, such as a desktop, laptop, tablet, etc.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
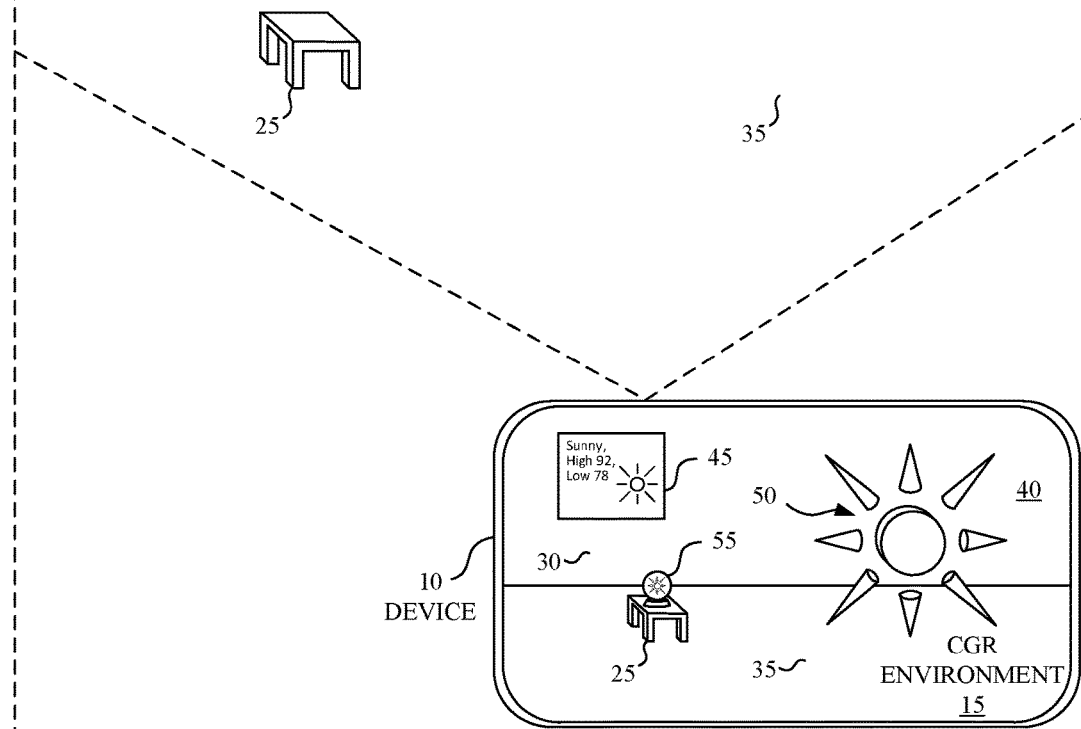
FIG. 1 illustrates a 3D environment provided on a device in which a first virtual element is displayed by the device based on positioning of the first virtual element relative to the environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Figure 2:
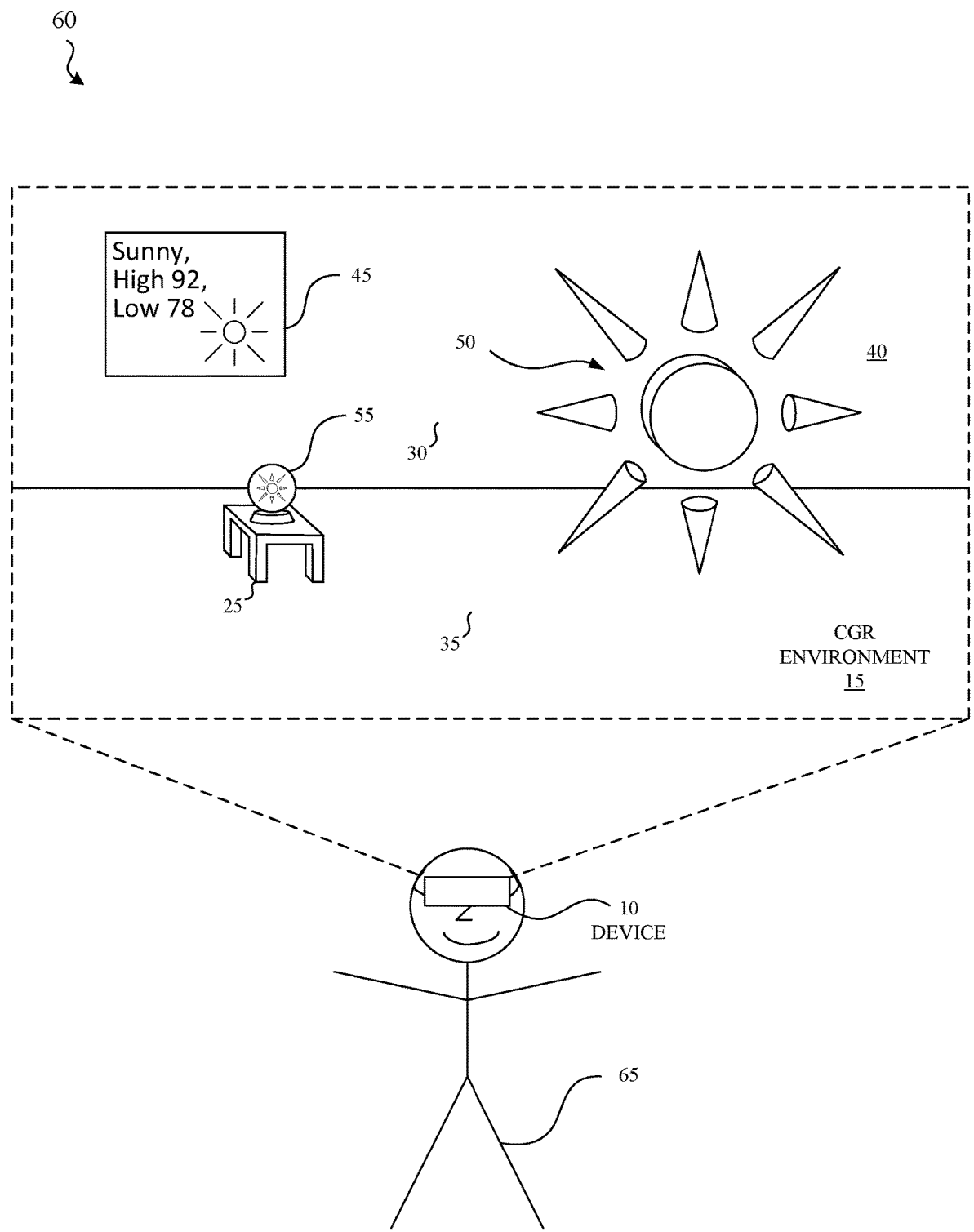
FIG. 2 illustrates the 3D environment provided by FIG. 1 in which the device is a head mounted device in accordance with some implementations.

Referring to FIGS. 1 and 2, an example operating environment 5 for implementing aspects of the present disclosure is illustrated. In general, operating environment 5 represents a device 10 involved in the display of 3D content, including but not limited to, a computer-generated reality (CGR) environment. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. As used herein, an HMD in which at least some light of the physical environment may pass through a transparent or translucent display is called an "optical see through" HMD.

Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display.

Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment.

Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, the device 10 is a handheld electronic device (e.g., a smartphone or a tablet) configured to present the CGR content 20 to a user. In some implementations, the device 10 is a head-mounted device (HMD) that a user wears. Such an HMD may enclose the field-of-view of the user. In some implementations, an HMD is worn is a way that one or more screens are positioned to display CGR content in the field-of-view of the user. In some implementations, two devices (e.g., an HMD and a controller device in wireless communication with the HMD) communicate with one another to provide the CGR content (e.g., the HMD using cameras and sensors to compile information about the real-world scene 5 and having one or more displays to display the CGR content, and the controller device processing that camera/sensor data and other data to provide the CGR content to the HMD).

In FIGS. 1 and 2, the 3D content (e.g., CGR environment 15) combines a depiction of a real-world scene 20 (e.g., via locally captured images of the real-world scene 20) and depictions of the virtual elements. Various implementations enable the device 10 to view or edit the CGR environment in different viewing modes (e.g., monoscopically, stereoscopically, etc.). The CGR environment can be pass-through video (e.g., in which real-world content is captured by a camera and displayed on a display) or optical-see-through (e.g., in which real-world content is viewed directly or through glass). For example, a CGR system may provide a user with pass-through video on a display of a consumer cell-phone by integrating rendered 3D graphics into a live video stream captured by an onboard camera. As another example, a CGR system may provide a user with optical see-through CGR by superimposing rendered 3D graphics into a wearable see-through head mounted display ("HMD"), electronically enhancing the user's optical view of the real-world with the superimposed 3D model.

The modality of a virtual element in the content is based on the location of the virtual element relative to the content. In some implementations, the modality of a virtual element is determined when the virtual element is first inserted into the content, e.g., based on the initial position of the virtual element. In some implementations, the modality of a virtual element is determined and changed when the virtual element is moved within the content. In some implementations, changes made to content affect the modality of a virtual element. For example, a user of the device 10 may move or alter an attribute of the content associated with the virtual element, e.g. eliminating a virtual surface that the virtual element is "resting on" such that the virtual element is left in open 3D space (e.g., "mid-air").

In the example of FIGS. 1 and 2, the device 10 presents a CGR environment 15. The CGR environment 15 observed on device 10 depicts a real-world scene 20 with real items, e.g., an end table 25, a wall 30, a floor 35, and open 3D space 40. One or more virtual elements are automatically or manually included in the CGR environment 15. In one example, the virtual elements are selected automatically based on the real objects in the CGR environment 15. In another example, a user provides input to select one or more virtual elements to include in the CGR environment 15. In some implementations, the CGR environment 15 includes a virtual element from a single source, such as from a single software application. In other implementations, the CGR environment 15 includes an arrangement of virtual elements from multiple sources. For example, CGR environment 15 may provide an CGR "desktop" for real or virtual elements, including multiple virtual elements from multiple, separately-executed software applications. For example, such an environment may display a depiction of a desk of the real environment having one or more virtual elements positioned on its top surface, on the walls, on the floor, etc., and such virtual elements may have been provided from individual, separately executing applications.

In the example of FIGS. 1 and 2, the CGR environment 15 sets forth planar surfaces such as end table 25, wall 30, floor 35, but in some implementations, CGR environment 15 may alternatively set forth non-planar surfaces (e.g., surfaces with complex geometry), including real-world non-planar surfaces and virtual or synthesized non-planar surfaces. Moreover, some implementations may use planes, triangle meshes, or volumetric representations to capture or represent real-world scene 20, as well as to generate the CGR environment 15. In some implementations, reference computer-aided drawing ("CAD") models may be used to identify or represent items, for example, end table 25.

In some implementations, real items of the real-world scene 20 are identified based on transitions or differences in texture, e.g., color, within the real-world scene 20 or CGR environment 15. For example, a real item, e.g., end table 25, may include a black area and the immediately adjacent area of the real-world scene 20 or CGR environment 15 may be white. Thus, the boundaries of a real item may be determined by identifying the areas of transitioning texture between light and dark colors. In some implementations, the real items are identified based on a structure-from-motion ("SfM") method, a simultaneous localization and mapping ("SLAM") method, a computer vision passive stereo method, a computer vision active stereo method comprising structured light, a photometric stereo method, a shape-from-shading method, a shape-from-defocus method, a geometric model-fitting method, a machine learning method, or a monocular depth estimation method.

The devices, systems, and methods disclosed herein enable the display of a virtual element based on its relative location to a physical or virtual attribute in a CGR environment 15. When a user of device 10 places or repositions a virtual element within a CGR environment 15 or changes the CGR environment 15 around the virtual element, the modality of the virtual element changes or adapts. Specifically, the modality of the virtual element is determined based on the location of the virtual element relative to one or more attributes of nearby CGR content. Such modality can include the appearance, functionality, or interactivity aspects of the virtual element.

Moreover, the CGR environment 15 may include co-planar virtual elements, e.g., a virtual monitor displayed on a depiction of a desk of the real environment having one or more virtual elements positioned on the virtual screen of the virtual monitor. In such an implementation, a first co-planar virtual element (e.g., the virtual monitor) may act as a recipient for placement of one or more secondary co-planar virtual elements (e.g., a weather app) and may define boundaries for placement of the secondary co-planar virtual element(s). In further implementations, the first co-planar virtual element may provide modal context for the secondary co-planar virtual element(s), i.e., the modality of the secondary co-planar virtual element(s) may change or adapt based on the first co-planar virtual element.

A virtual element, e.g., a weather object, is included in the CGR environment 15 in different modalities 45, 50, 55 according to the virtual element's different locations in the CGR environment 15. To illustrate this, multiple instances of the virtual element are depicted in FIG. 1 at different locations in different modalities. These instances of the virtual element depict the modality of the virtual element at different positions, for example, as the virtual element might be positioned at different points in time during the use of the CGR content. Accordingly, the different modalities 45, 50, 55 are not necessarily displayed at the same instant in time. The different modalities 45, 50, 55 would only be displayed at the same instant in time if multiple distinct instances of the virtual element are simultaneously included in the CGR content, which is possible in some implementations.

FIG. 1 illustrates how the modality of the virtual element depends on its location relative to one or more attributes (e.g., being on a surface, vertical surface, a horizontal surface, a wall, a floor, a ceiling, a table, in mid-air, etc.) of the CGR environment 15. In this example, the modality of the virtual element depends on whether the virtual element is positioned on end table 25, on wall 30, on floor 35, or in open 3D space 40.

The modalities, e.g., appearances, functions, and interactive features, of the virtual element can be configured by the virtual element creator, for example, who may create different modality state definitions for each of multiple positional states (e.g., on horizontal surface, on vertical surface, in mid-air, etc.) associated with multiple CGR content attributes (e.g., surfaces, horizontal surfaces, vertical surfaces, walls, floors, tables, ceilings, etc.).

FIG. 1 illustrates the virtual element displayed in a vertical surface modality 45. Based on the virtual element being positioned on the wall 30 and thus associated with a vertical surface attribute, the virtual element is displayed in the vertical surface modality 45 (e.g., as a weather sign). In this example, the vertical surface modality 45 of the virtual elements displays a 2D image or sign representing the weather and the high and low predicted daily temperatures. The functionality and interactivity of the virtual element may depend upon its modality. For example, the vertical surface modality 45 of the virtual element may provide modality-specific functionality, such as a display of a Doppler radar map. As another example, the vertical surface modality 45 of the virtual element may provide modality-specific user interactivity, such as a user-controllable animation. For example, the vertical surface modality 45 of the virtual element may be configured to provide a weather animation when the virtual element or an area proximate to the virtual element is clicked on or touched on a touch screen of the device 10. In another example, the vertical surface modality 45 of the virtual element may be configured to change its appearance, e.g., its displayed information, when the virtual element is hovered over, touched, or clicked. In another example, the vertical surface modality 45 of the virtual element may be configured to enlarge its appearance based on the interactions of the user.

FIG. 1 further illustrates the virtual element displayed in an open space modality 50. In this example, the appearance, functionality and interactivity of the open space modality 50 of the virtual element differ from those of the vertical surface modality 45. In contrast to the 2D appearance of the vertical surface modality 45, the open space modality 50 has a 3D appearance. The open space modality 50 provides a 3D representation of the current weather or predicted weather conditions in the user's current geographic location, e.g., displaying a floating sun, a rain cloud, a tornado, etc.

FIG. 1 further illustrates the virtual element displayed in a horizontal surface modality 55. In this example, the appearance, functionality and interactivity of the horizontal surface modality 55 of the virtual element differ from those of the vertical surface modality 45 and the open space modality 50. The virtual element in this example is positioned relative to a horizontal flat surface of depiction of a real-world end table 25. Based on this location, the virtual element is displayed in a horizontal surface modality 55, e.g., as a decorative snow globe in which the current or predicted weather is displayed in a 3D manner within the globe. Furthermore, the exemplary horizontal surface modality 55 presents the weather using time-varying content, e.g., falling snow or rain in the globe according to the predicted weather. The interactivity of the horizontal surface modality 55, e.g., the snow globe, may include starting or stopping animation of the globe when a user clicks or touches the globe via an interface of the device 10. As adapted by one of ordinary skill in the art, appearance, functionality, and interactivity of a virtual element may include any number of features, e.g., displaying additional forecast information when the snow globe is clicked on or touched via the device 10.

FIG. 2 illustrates the environment provided by FIG. 1 in which the device is an HMD configured to be worn on the head of a user 65. Such an HMD may enclose the field-of-view of the user 65. An HMD can include one or more screens or other displays configured to display the CGR environment 15. In some implementations, an HMD includes one or more screens or other displays to display the virtual element with real-world content that is in a field-ofview of the user 65. In some implementations, the HMD is worn in a way that one or more screens are positioned to display the CGR environment 15 with real-world content of the real-world scene 20 in a field-of-view of the user 65. In some implementations, the device 10 that provides the CGR environment 15 is a chamber, enclosure, or room configured to present the CGR environment 15 in which the user 65 does not wear or hold the device 10.

Figure 3:
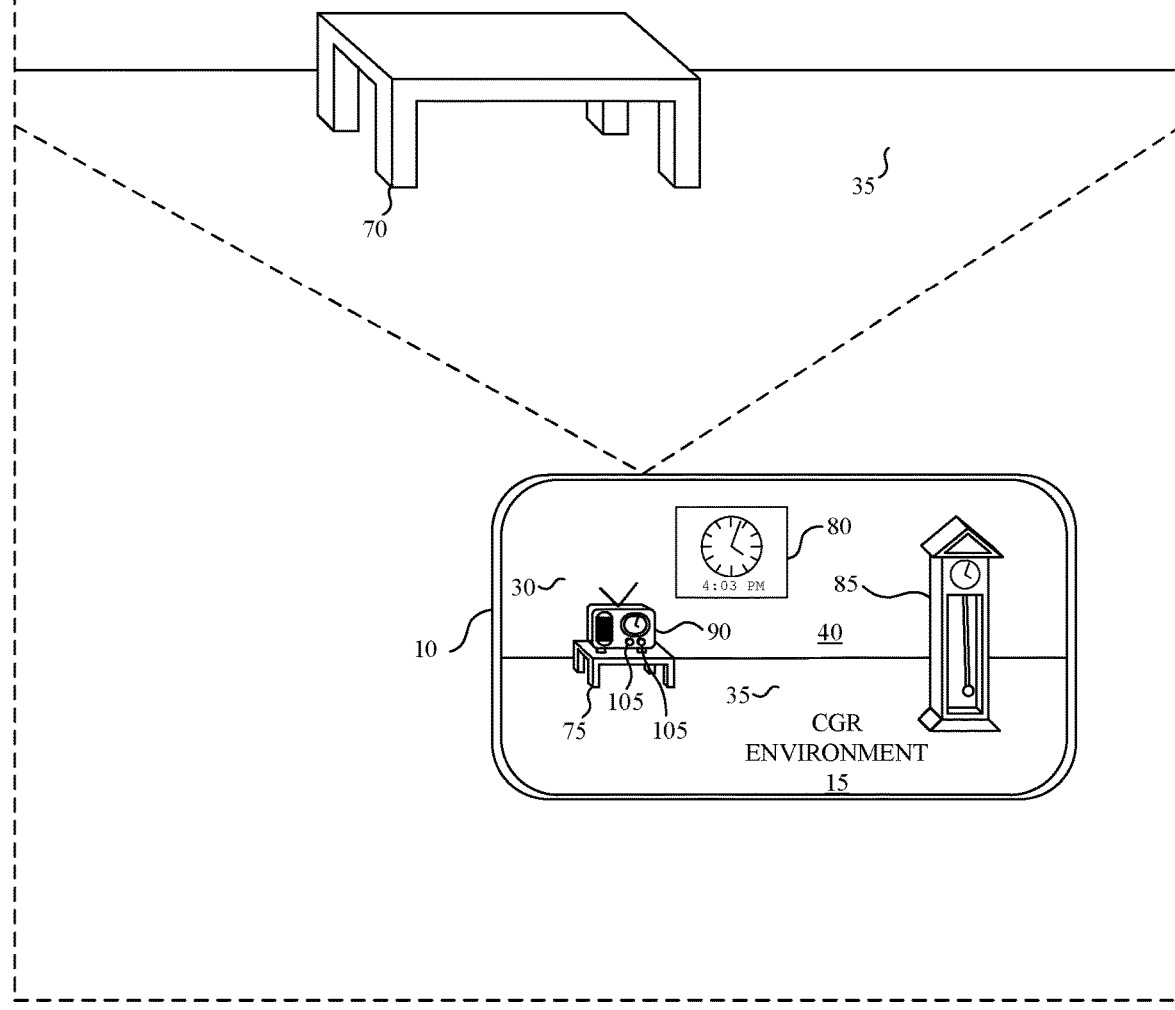
FIG. 3 illustrates a 3D environment provided on a device in which a second virtual element is displayed by the device based on positioning of the second virtual element relative to the environment in accordance with some implementations.
Figure 4:
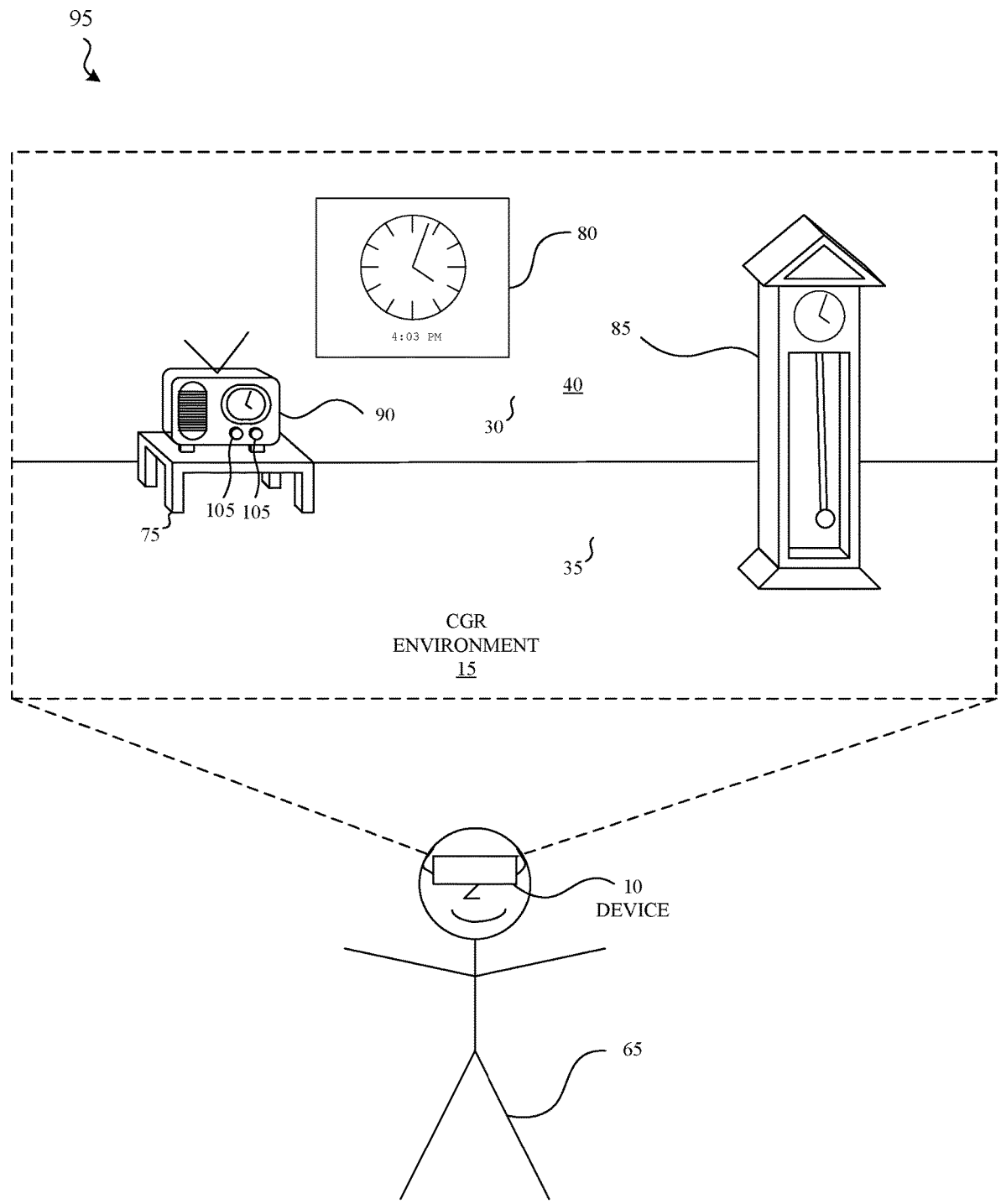
FIG. 4 illustrates the 3D environment provided by FIG. 3 in which the device is a head mounted device in accordance with some implementations.

FIGS. 3 and 4 illustrate an exemplary operating environment 70 in which CGR content includes a virtual element that provides time information, such as the current time. In exemplary operating environment 70, the real-world scene 20 includes multiple real world objects and associated attributes, e.g., a wall 30, a floor 35, a table 75, and open 3D space 40. As with the examples of FIGS. 1 and 2, the CGR environment 15 depicted in the examples of FIGS. 3 and 4, includes a virtual element that has different modalities when placed in different positions relative to attributes of the CGR content. The modalities, e.g., appearances, functions, and interactive features, of the virtual element can be configured by the virtual element creator, for example, who may create different modality state definitions for each of multiple positional states (e.g., on horizontal surface, on vertical surface, in mid-air, etc.) associated with multiple CGR content attributes (e.g., surfaces, horizontal surfaces, vertical surfaces, walls, floors, tables, ceilings, etc.).

FIG. 3 illustrates the virtual element displayed in a vertical surface modality 45. In the illustrative operating environment 70, a user may position the virtual element near the wall 30 in the CGR environment 15. When positioned near the wall 30, the virtual element has a vertical surface modality 80. In the vertical surface modality 80, the virtual element has the appearance, functionality, and interactivity of a wall clock.

The virtual element can be configured to be customized by an end user in one or more of its modalities. For example, when the virtual element is placed near the wall 30, the virtual element may be displayed in a vertical surface modality 80 and the user may be presented with modality-specific display options, e.g., the user may choose whether to display the time in analog or digital format in this particular vertical surface modality 80.

FIG. 3 further illustrates the virtual element displayed in a floor modality 85. As an alternative to placing the virtual element along the wall 30, the user may place the virtual element in a proximate location to the floor 35. In the exemplary illustration, the floor modality 85 of the virtual element is a standing grandfather clock. The floor modality 85 of the virtual element may provide modality-specific functions and interactive features. As an example, the floor modality 85 may include a swinging pendulum, a cuckoo bird that emerges from the face of the grandfather clock when a user provides a user interaction (e.g., a voice command, hand gesture, gaze, etc.) of the device 10, etc.

FIG. 3 further illustrates the virtual element displayed in a horizontal surface modality 55. For example, if a user positions the virtual element near a horizontal surface of table 75 in CGR environment 15, the virtual element may be displayed in a horizontal surface modality 90. In the horizontal surface modality 90, the virtual element has the appearance of a clock radio. In this example, the horizontal surface modality 90 provides a user with the ability to interact via interactive features 105. Specifically, the horizontal surface modality 90 of the virtual element, e.g. the clock radio, includes knobs or buttons to control a radio feature of the virtual element by tuning on the radio or adjusting the volume of the clock radio.

As illustrated in FIG. 4, the device 10 may be an HMD configured to be worn on the head of a user 65.

Figure 5:
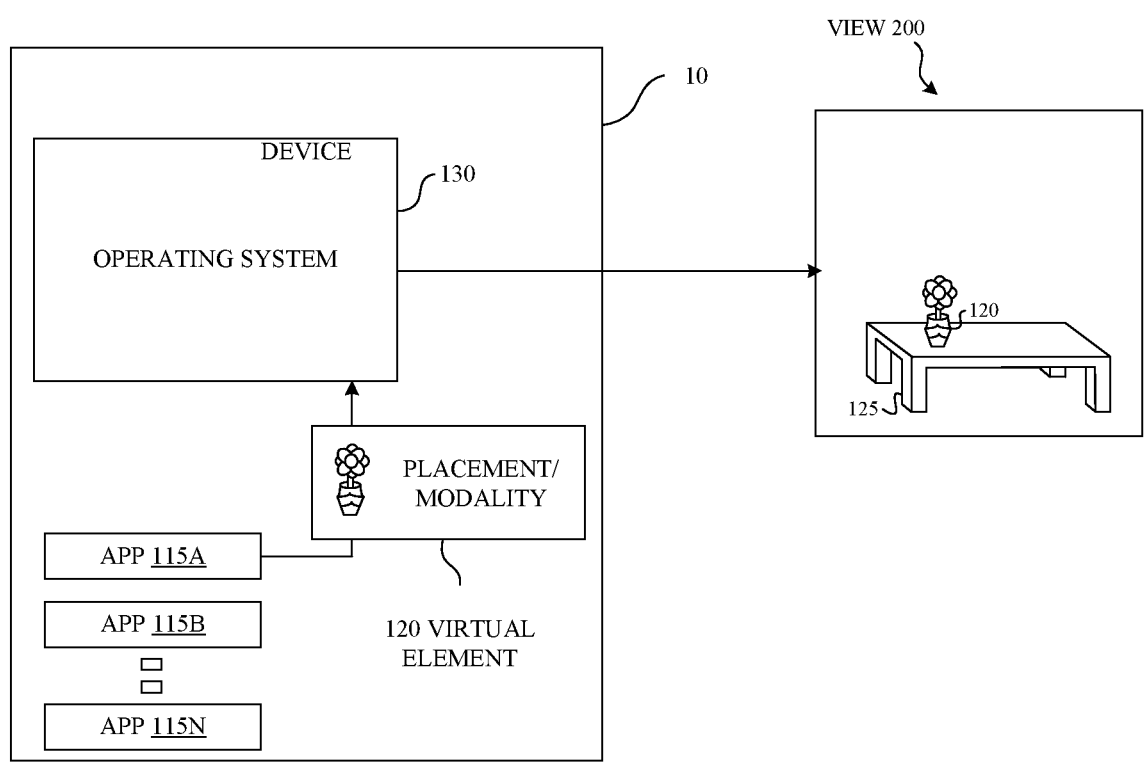
FIG. 5 is a block diagram of the device of FIG. 1 including multiple apps that provide virtual elements to an operating system for inclusion in the 3D environment in accordance with some implementations.

In some implementations, CGR content, including depictions of real world objects and virtual elements, is provided by a single application. In other implementations, an application such as an operating system provides CGR content that includes a shared virtual space in which content from separate sources is combined. In one example, an operating system provides a shared virtual space that includes virtual elements provided by one or more separate applications. FIG. 5 provides an example of such an implementation.

FIG. 5 is a block diagram of the device 10 including multiple apps 115a-n that provide virtual elements, such as virtual element 120, to an operating system 130 for inclusion in the CGR environment 15 in accordance with some implementations. In this example, the app 115a provides a virtual element 120 including information about the placement and modality of the virtual element 120. Such modality information such as information about how the virtual element 120 should appear, function, and interact in different modalities. The modality information can include one or more 2D or 3D models of the virtual element 120. In some implementations, a 3D model of the virtual element 120 identifies a collection of points in 3D space, connected by various geometric entities such as triangles, lines, curves, surfaces etc. In FIG. 5, the virtual element 120 is added to the CGR environment 15 and depicted in view 200 of the CGR environment 15 on top of table 125. Virtual element 120 is provided by app 115a to the operating system 130 and includes modality information indicating that the virtual element 120 is to change modality based on placement.

Figure 6:
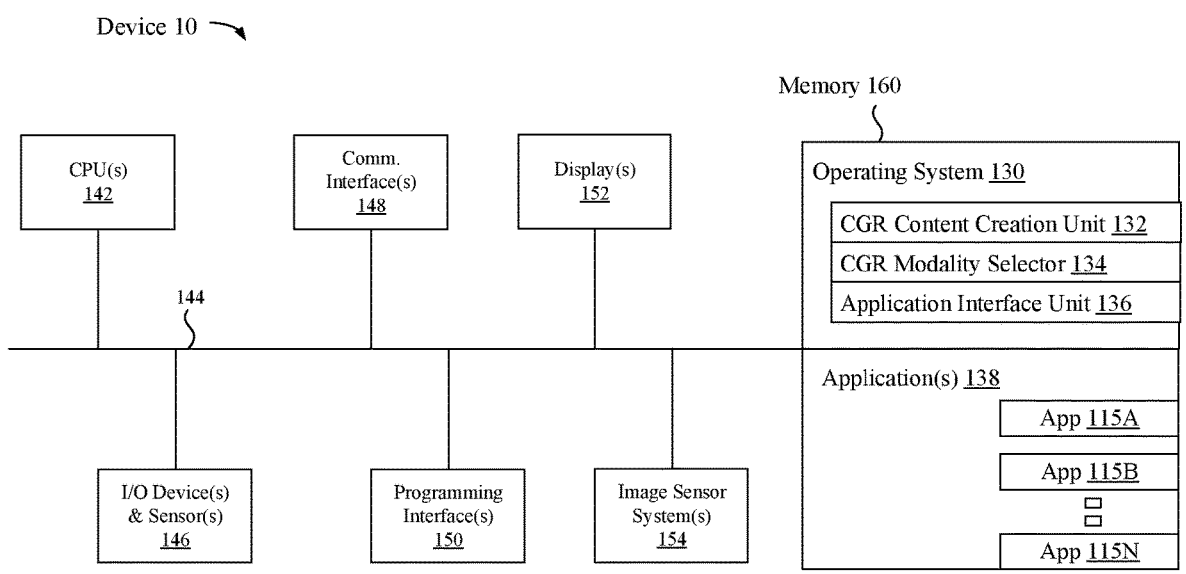
FIG. 6 is a block diagram illustrating device components of an exemplary device according to some implementations.

FIG. 6 is a block diagram illustrating device components of device 10 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 142 (e.g., microprocessors, ASICs, FPGAs, GPUs, CPUs, processing cores, or the like), one or more input/output ("I/O") devices and sensors 146, one or more communication interfaces 148 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 150, one or more displays 152, one or more interior or exterior facing image sensor systems 154, a memory 160, and one or more communication buses 144 for interconnecting these and various other components.

In some implementations, the one or more communication buses 144 include circuitry that interconnects and controls communications between system components. In some implementations, the one or more I/O devices and sensors 146 include at least one of a touch screen, a softkey, a keyboard, a virtual keyboard, a button, a knob, a joystick, a switch, a dial, an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like. In some implementations, movement, rotation, or location of the device 10 detected by the one or more I/O devices and sensors 146 provides input to the device 10.

In some implementations, the one or more displays 152 are configured to present a user interface. In some implementations, the one or more displays 152 correspond to holographic, digital light processing ("DLP"), liquid-crystal display ("LCD"), liquid-crystal on silicon ("LCoS"), organic light-emitting field-effect transitory ("OLET"), organic light-emitting diode ("OLED"), surface-conduction electron-emitter display ("SED"), field-emission display ("FED"), quantum-dot light-emitting diode ("QD-LED"), micro-electromechanical system ("MEMS"), or the like display types. In some implementations, the one or more displays 152 correspond to diffractive, reflective, polarized, holographic, etc. waveguide displays. In one example, the device 10 includes a single display. In another example, the device 10 includes a display for each eye. In some implementations, the one or more displays 152 are capable of presenting CGR content.

In some implementations, the one or more image sensor systems 154 are configured to obtain image data that corresponds to at least a portion of a scene local to the device 10. The one or more image sensor systems 154 can include one or more RGB cameras (e.g., with a complimentary metal-oxide-semiconductor ("CMOS") image sensor or a charge-coupled device ("CCD") image sensor), monochrome camera, IR camera, event-based camera, or the like. In various implementations, the one or more image sensor systems 154 further include illumination sources that emit light, such as a flash.

The memory 160 includes high-speed random-access memory, such as DRAM, SRAM, DDR RAM, or other random-access solid-state memory devices. In some implementations, the memory 160 includes non-volatile memory, such as one or more magnetic disk storage devices, optical disk storage devices, flash memory devices, or other non-volatile solid-state storage devices. The memory 160 optionally includes one or more storage devices remotely located from the one or more processing units 142. The memory 160 comprises a non-transitory computer readable storage medium. In some implementations, the memory 160 or the non-transitory computer readable storage medium of the memory 160 stores the following programs, modules and data structures, or a subset thereof including an optional operating system 130 and one or more applications 115a-n. The operating system 130 includes procedures for handling various basic system services and for performing hardware dependent tasks.

In some implementations, the operating system 130 includes an CGR Content Creation Unit 132 for generating CGR content (e.g., views of an CGR environment) using data from multiple sources, e.g., real-world data from a camera and virtual elements from one or more application(s) 138 (e.g., 115a-n). The operating system 130 further includes an CGR Modality Selector Unit 134 used by the one or more application(s) 138 for determining modality. The CGR Modality Selector Unit 134 is configured to identify modalities based on location of virtual elements relative to the CGR content. The operating system 130 further includes an Application Interface Unit 136 for receiving information from application(s) 138 such as virtual element information and exchanging information with apps 115a-n regarding the placement of virtual elements and selection of modalities as interpreted by CGR Content Creation Unit 132 and CGR Modality Selector Unit 134. In some implementations, functionality to adapt modality based on position is built into the apps 115a-n rather than the operating system 130. In some implementations, a single application, module, or other functional unit defines virtual elements and includes functionality to create CGR content and include the virtual elements in the CGR content according to modalities selected based on the positions of the virtual elements in the CGR content.

FIG. 6 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 7:
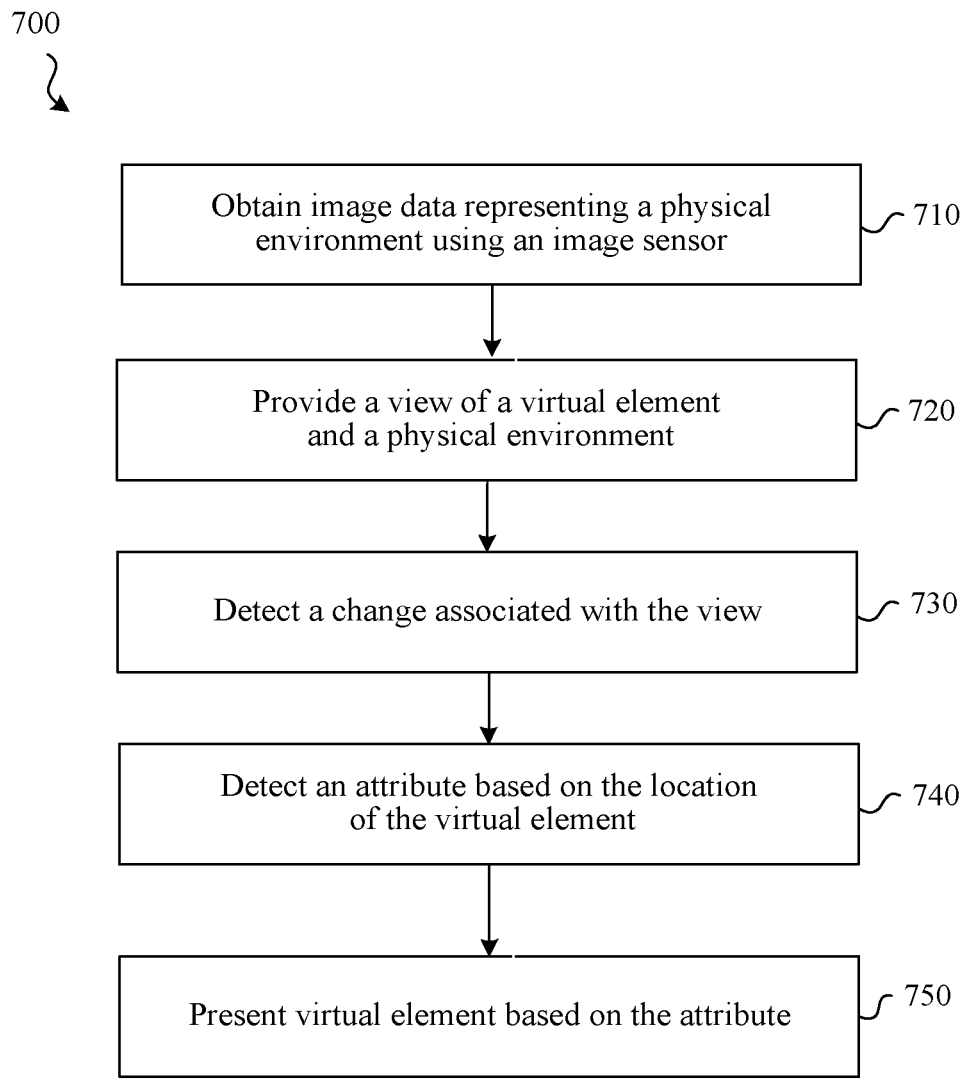
FIG. 7 is a flowchart representation of a method for presenting a view including virtual elements where the presentation of the virtual elements is based on positioning relative to a physical environment depicted in the view.

FIG. 7 is a flowchart representation of a method 700 for presenting a view including virtual elements where the presentation of the virtual elements is based on positioning relative to a physical environment depicted in the view. In some implementations, the method 700 is performed by a device (e.g., device 10 of FIGS. 1-6). The method 700 can be performed at a mobile device, HMD, desktop, laptop, or server device. In some implementations, the method 700 is performed by processing logic, including hardware, firmware, software, or a combination thereof. In some implementations, the method 700 is performed by a processor executing code stored in a non-transitory computer-readable medium (e.g., a memory).

At block 710, the device obtains image data representing a physical environment using an image sensor. The images may be captured by either a local or remote recorder/camera and, in some implementations, a recorder/camera may be a stand-alone device, may be incorporated into a mobile phone or video game console, or may be included in a HMD. The light reflected by a real-world scene may be captured by the one or more camera images. In some implementations, the method may combine the one or more camera images of the real-world scene to form a single image or a 3D model of the environment.

At block 720, the method 700 provides a view depicting one or more virtual elements and the physical environment on a display of the device. The view can include pass-through video (e.g., in which real-world content is captured by a camera and displayed on a display with the virtual element) or optical-see-through content (e.g., in which real-world content is viewed directly or through glass and supplemented with a displayed image of the virtual element).

At block 730, the method 700 detects a change in the view. The change may include placement of the virtual element at a location in the view relative to the physical environment depicted in the view. Moreover, the change may be received by the device via input positioning the virtual element at the location. For example, a user of the device may provide keyboard input, mouse input, touch input, voice input, or other input to change an attribute or characteristic of the view, including the virtual element. For example, the user may change the size, color, texture, orientation, etc. of a virtual element or 3D model, add a 3D model or portion of a 3D model, delete a 3D model or portion of a 3D model, etc. In some implementations, changes are consolidated or coalesced to improve the efficiency of the system. For example, a change can involve detecting multiple changes between an initial state and a final state of the 3D model and identifying differences between the initial state and the final state of the 3D model. For example, if a virtual element is first moved 10 units left and then moved 5 units right, a single change of virtual element moving 5 units left may be identified.

At block 740, the method 700 detects an attribute in the physical environment depicted in the view based on the location of the virtual element in the view. In some implementations, detecting the attribute includes detecting a surface, an adjacent surface or element, or a type of surface upon which the virtual element is positioned in the physical environment depicted in the view, e.g., determining whether the virtual element is positioned in free space or on a floor, table, wall, or ceiling. In some implementations, detecting the attribute includes using a model, such as a neural network or other machine-learning model, to identify objects and other attributes of the physical environment. In some implementations, a machine-learning model is trained to identify walls, ceilings, floors, tables, ramps, planar surfaces, curved surfaces, round surfaces, textured surfaces, surfaces of particular colors or textures, etc. In some implementations, detecting the attribute includes identifying a classification of a portion of the physical environment depicted in the view using a classifier or identifying an amount of the portion upon which the virtual element can be positioned, e.g., detecting that the virtual element is positioned in mid-air (e.g., that the virtual element is not positioned on a surface). Moreover, in some implementations, the method 700 determines a 3D model of the physical environment having a coordinate system and identifies the attribute based on a location of the virtual element relative to the attribute in the 3D model. In some implementations, the method 700 determines whether display of the element at the location is permitted based on the attribute.

At block 750, the method 700 presents the virtual element based on the attribute. In some implementations, the method 700 selects a modality (e.g., an appearance, function, or interactivity) of the virtual element based on the attribute. FIGS. 1-4 provide examples of adapting the modality (e.g., appearance, function, or interactivity) of a virtual element based on the location of the virtual element relative to attributes of the environment.

In implementations, the method 700 updates the view on the display of the device such that the view includes the virtual element according to the selected modality. The method 700 may send a notification to a separate app that provided the virtual element. The notification may identify an attribute of the view corresponding to the location of the virtual element and the app may respond with specific information that updates the appearance, function, or interactivity of the virtual element based on the modality.

Figure 8:
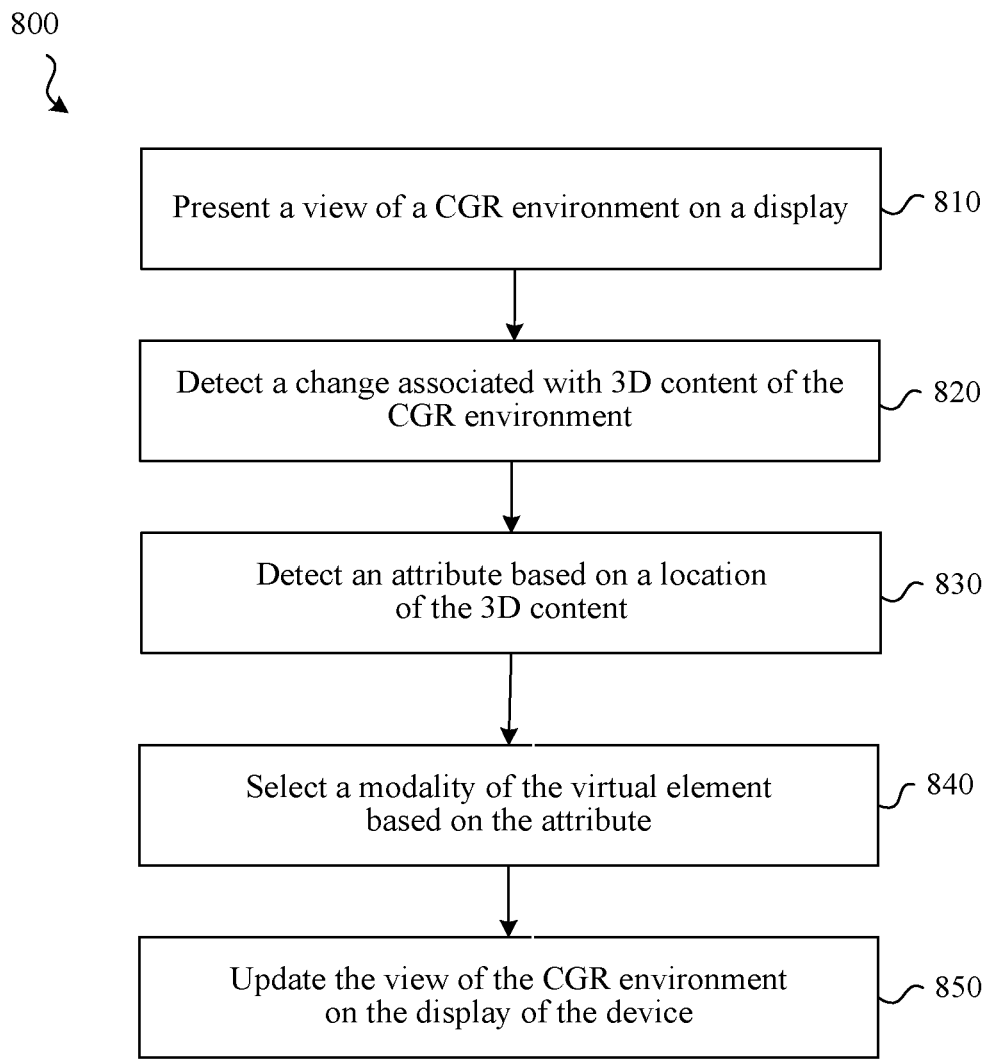
FIG. 8 is a flowchart representation of a method for presenting 3D content on a display where a virtual element changes modality based on the location of the virtual element relative to the environment depicted in the 3D content.

FIG. 8 is a flowchart representation of a method 800 for presenting 3D content on a display where 3D content (e.g., a virtual element) changes modality based on the location of the 3D content relative to the CGR environment. In some implementations, the method 800 is performed by a device (e.g., device 10 of FIGS. 1-6). The method 800 can be performed at a mobile device, HMD, desktop, laptop, or server device. In some implementations, the method 800 is performed by processing logic, including hardware, firmware, software, or a combination thereof. In some implementations, the method 800 is performed by a processor executing code stored in a non-transitory computer-readable medium (e.g., a memory).

At block 810, the method 800 presents a view of a CGR environment on the display of a device. The CGR environment may include one or more items of 3D content (e.g., physical or virtual elements). The 3D content can include pass-through video (e.g., in which real-world content is captured by a camera and displayed on a display with the virtual element) or optical-see-through content (e.g., in which real-world content is viewed directly or through glass and supplemented with a displayed image of the virtual element).

At block 820, the method 800 detects a change associated with the 3D content. The change may include a positioning of a virtual element at a location relative to the rest of the environment. Moreover, the change may be received by the device via input positioning the virtual element at the location. For example, a user of the device may provide hand detection input, keyboard input, mouse input, touch input, voice input, or other input to change an attribute of the 3D content, including a virtual element. For example, the user may change the size, color, texture, orientation, etc. of a virtual element or 3D model, add a 3D model or portion of a 3D model, delete a 3D model or portion of a 3D model, etc.

At block 830, the method 800 detects an attribute based on the location of the 3D content. In some implementations, detecting the attribute includes detecting an adjacent surface or element, or a type of surface upon which the virtual element is positioned in the environment depicted in the 3D content, e.g., determining whether the virtual element is positioned in free space or on a floor, table, wall, ceiling, or another virtual element. In some implementations, detecting the attribute includes identifying a classification of a portion of the environment depicted in the 3D scene using a classifier and/or identifying an amount of the portion available upon which the virtual element can be positioned, e.g., detecting that the virtual element is positioned in mid-air or within the boundaries of another co-planar virtual element. Moreover, in some implementations, the method 800 determines a 3D model of the CGR environment having a coordinate system and identifying the attribute based on a location of the virtual element relative to the attribute in the CGR environment. In some implementations, the method 800 determines whether display of the element at the location is permitted based on the attribute.

Attributes are used to describe the components of the CGR environment, including real-world and/or virtual components, as well as virtual objects. Furthermore, attributes may exhibit intra-class variation (e.g., an ocean might have waves or it might not) as well as inter-class relationships (e.g., both a pool and an ocean could have waves). Examples of attributes may include surface properties (e.g., shiny), functions or affordances (e.g., bouncing, flashing), spatial envelope attributes (e.g., enclosed, symmetric), material attributes (e.g., aluminum, wood), or any other attribute-based representation of 3D content.

At block 840, the method 800 selects a modality of the virtual element based on the attribute. In some implementations, the method 800 selects an appearance, function, and/or interactivity of the virtual element based on the attribute.

At block 850, the method 800 updates the 3D content on the display of the device. The 3D content may be updated to include the virtual element according to the selected modality. The method 800 may send a notification to a separate app that provided the virtual element. The notification may identify an attribute corresponding to the location of the virtual element and the app may respond with modality-specific information that updates the appearance, function, or interactivity of the virtual element.

Figure 9:
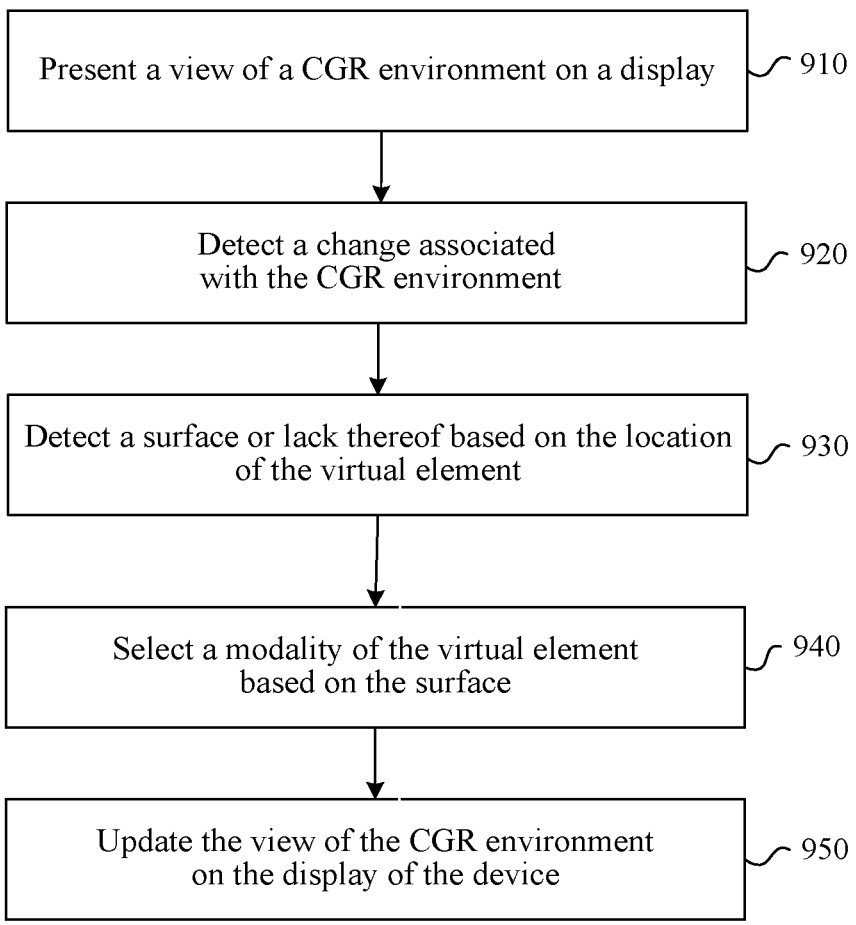
FIG. 9 is a flowchart representation of a method for presenting content on a display where a virtual element changes modality based on the location of the virtual element relative to the environment depicted in the content.

FIG. 9 is a flowchart representation of a method 900 for presenting CGR environment on a display where a virtual element changes modality based on the location of the virtual element relative to the rest of the CGR environment. In some implementations, the method 900 is performed by a device (e.g., device 10 of FIGS. 1-6). The method 900 can be performed at a mobile device, HMD, desktop, laptop, or server device. In some implementations, the method 900 is performed by processing logic, including hardware, firmware, software, or a combination thereof. In some implementations, the method 900 is performed by a processor executing code stored in a non-transitory computer-readable medium (e.g., a memory).

At block 910, the method 900 presents a view of a CGR environment on the display of a device. The CGR environment can include pass-through video (e.g., in which real-world content is captured by a camera and displayed on a display with the virtual element) or optical-see-through content (e.g., in which real-world content is viewed directly or through glass and supplemented with a displayed image of the virtual element).

At block 920, the method 900 detects a change associated with the CGR environment. The change may include a positioning of a virtual element and/or a physical object at a location relative to the physical environment and/or the virtual environment/elements depicted in the CGR environment. Moreover, the change may be received by the device via input positioning the virtual element at the location. For example, a user of the device may provide hand detection input, keyboard input, mouse input, touch input, voice input, or other input to change an attribute of CGR environment, including the virtual element. For example, the user may change the size, color, texture, orientation, etc. of a virtual element or 3D model, add a 3D model or portion of a 3D model, delete a 3D model or portion of a 3D model, etc. As another example, the user may change the location of a physical object in the real-world environment which may in turn alter the relative location of a virtual element depicted in the CGR environment with respect to the physical object.

At block 930, the method 900 detects a surface (or lack thereof in the case of a freestanding or floating item) depicted in the CGR environment based on the location of the virtual element. In some implementations, detecting the surface includes detecting an adjacent surface or element, or a type of surface upon which the virtual element is positioned in the environment depicted in the CGR content, e.g., determining whether the virtual element is positioned in free space or on a floor, table, wall, ceiling, or another virtual element. In some implementations, detecting the surface includes identifying a classification of a portion of the environment depicted in the CGR environment using a classifier and/or identifying an amount of the portion available upon which the virtual element can be positioned, e.g., detecting that the virtual element is positioned in mid-air or within the boundaries of another co-planar virtual element. Moreover, in some implementations, the method 900 determines a 3D model of the CGR environment having a coordinate system and identifying the surface based on a location of the virtual element relative to the surface in the 3D model.

In some implementations, the modality of a virtual object is based on the location of the virtual object relative to another virtual object or objects. For example, the modality of a virtual object may depend upon another virtual object upon which it is positioned (e.g., whether the virtual object is on the virtual floor or virtual wall, on a virtual table or in mid-air, etc.).

In some implementations, a method provides a view of an environment depicting multiple virtual objects or other elements. The method detects a change in this view. The change may include an automatic or user input-based placement of a virtual element at a location in the view relative to the one or more other virtual elements depicted in the view. Moreover, the change may be received by the device via input positioning the virtual element at the location. For example, a user of the device may provide keyboard input, mouse input, touch input, voice input, or other input to change an attribute or characteristic of the view, including the virtual element. For example, the user may change the size, color, texture, orientation, etc. of a virtual element or 3D model of a virtual element, add a 3D model or portion of a 3D model, delete a 3D model or portion of a 3D model, etc.

The method detects an attribute of the one or more other virtual elements depicted in the view based on the location of the virtual element in the view. In some implementations, detecting the attribute includes detecting a virtual surface, an adjacent virtual surface or virtual element, or a type of virtual surface upon which the virtual element is positioned, e.g., determining whether the virtual element is positioned on a virtual floor, virtual table, virtual wall, or virtual ceiling. In some implementations, the method determines whether display of the virtual element at the location is permitted based on the attribute. The method selects or changes the modality of the virtual element based on the attribute of the one or more other virtual elements. In some implementations, the method selects an appearance, function, or interactivity of the virtual element based on the attribute and updates the view to include the virtual element according to the selected modality. The method may send a notification to a separate app that provided the virtual element. The notification may identify an attribute of the view corresponding to the location of the virtual element and the app may respond with modality-specific information that updates the appearance, function, or interactivity of the virtual element.

Examples of CGR environment objects that may include a surface include, but are not limited to, another virtual element, a table, a floor, a wall, a desk, a book, a body of water, a mountain, a field, a vehicle, a counter, a human face, a human hand, human hair, another human body part, an entire human body, an animal or other living organism, clothing, a sheet of paper, a magazine, a book, a vehicle, a machine or other man-made object having a planar surface, and any other real-world or virtual object or scenery that may exhibit a planar surface over time. Furthermore, the CGR content may include any number of planar surfaces. Furthermore, the term surface is not intended to limit a surface of this disclosure to a particular object or portion of the CGR environment. One or more surfaces may be identified in the CGR environment and thus, in some implementations an individual surface may be identified and in other implementations all the surfaces in the CGR environment may be identified. Moreover, texture information may be associated with the surface, e.g., color or appearance. The information about a surface or the surfaces in the CGR environment may be used for numerous purposes including, but not limited to, purposes that involve generating or synthesizing light sources, shadowing, or otherwise interpreting the rendering of the virtual element.

At block 940, the method 900 selects a modality of the virtual element based on the surface. In some implementations, the method 900 selects an appearance, function, and/or interactivity of the virtual element based on the surface.

At block 950, the method 900 updates the CGR environment on the display of the device such that the CGR environment includes the virtual element according to the selected modality. The method 900 may send a notification to a separate app that provided the virtual element. The notification may identify an attribute of the CGR environment corresponding to the location of the virtual element and the app may respond with modality-specific information that updates the appearance, function, or interactivity of the virtual element.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node may be termed a second node, and, similarly, a second node may be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a device with a processor and a computer readable medium:
      providing a view comprising a virtual element and a physical environment, wherein the virtual element is a first type of modality and is at a first location in the view relative to the physical environment;
      detecting a change in the view, the change comprising placement of the virtual element at a second location in the view; and
      in response to detecting the change in the view based on the placement of the virtual element at the second location:
         detecting an attribute of the physical environment at the second location of the virtual element in the view;
         selecting a second type of modality of the virtual element based on the detected attribute, wherein the first type of modality comprises a first set of interactive features and the second type of modality comprises a second set of interactive features;

determining, based on the selected second type of modality and the second location of the virtual element in the view, whether to update the virtual element;

in accordance with determining to update the virtual element, updating the virtual element based on the selected type of modality, wherein updating the virtual element comprises:

changing a size, shape, design, or color attribute of the virtual element, and changing modality-specific functions of the virtual element from the first set of interactive features to the second set of interactive features; and presenting an updated view of the updated virtual element and the physical environment.

2. The method of claim 1, wherein providing the view comprises:

obtaining, using an image sensor, an image of the physical environment;

generating a representation of the physical environment using the obtained image; and presenting the virtual element with the representation of the physical environment.

3. The method of claim 1, wherein providing the view comprises:

identifying, using an image sensor, a feature in the physical environment; and presenting the virtual element on an optical see-through display responsive to identifying the feature.

4. The method of claim 1, wherein selecting the second type of modality of the virtual element based on the detected attribute comprises:

in accordance with determining that the attribute is a first attribute, updating the virtual element to have a first visual appearance when updating the virtual element; and in accordance with determining that the attribute is a second attribute, updating the virtual element to have a second visual appearance when updating the virtual element, wherein the first visual appearance is different from the second visual appearance.

5. The method of claim 1, wherein selecting the second type of modality of the virtual element based on the detected attribute comprises:

in accordance with determining that the attribute is a first attribute, updating the virtual element to be updated to have a first functionality when updating the virtual element; and in accordance with determining that the attribute is a second attribute, updating the virtual element to be updated to have a second functionality when updating the virtual element, wherein the first functionality is different from the second functionality.

6. The method of claim 1, wherein detecting the change in the view comprises receiving user input representing a change in the location of the virtual element.

7. The method of claim 1, wherein selecting the second type of modality of the virtual element based on the detected attribute comprises determining that the virtual element is on a planar surface.

8. The method of claim 1, wherein selecting the second type of modality of the virtual element based on the detected attribute comprises determining that the virtual element is on a horizontal planar surface.

9. The method of claim 1, wherein selecting the second type of modality of the virtual element based on the detected attribute comprises determining that the virtual element is on a vertical planar surface.

10. The method of claim 1, wherein detecting the attribute comprises detecting whether the second location is a planar surface and wherein selecting the second type of modality of the virtual element based on the detected attribute comprises determining that the planar surface is a wall.

11. The method of claim 1, wherein detecting the attribute comprises detecting whether the second location is a planar surface and wherein selecting the second type of modality of the virtual element based on the detected attribute comprises determining that the planar surface is a table.

12. The method of claim 1, wherein detecting the attribute comprises detecting whether the second location is a planar surface and wherein selecting the second type of modality of the virtual element based on the detected attribute comprises determining that the planar surface is a floor.

13. The method of claim 1, wherein detecting the attribute comprises detecting whether the second location is a planar surface and wherein selecting the second type of modality of the virtual element based on the detected attribute comprises determining that the planar surface is a ramp.

14. The method of claim 1, wherein detecting the attribute comprises detecting whether the second location is a planar surface and wherein selecting the second type of modality of the virtual element based on the detected attribute comprises determining that the planar surface is a stairway.

15. The method of claim 1, wherein detecting the attribute comprises detecting whether the second location is a planar surface and wherein selecting the second type of modality of the virtual element based on the detected attribute comprises determining that the planar surface is a ceiling.

16. The method of claim 1, wherein detecting the attribute comprises:

identifying a classification of a portion of the physical environment using a classifier; and identifying an amount of the portion available upon which the virtual element can be positioned.

17. The method of claim 1, wherein presenting an updated view of the updated virtual element and the physical environment comprises:

in accordance with determining that the attribute is of a first attribute, displaying the updated virtual element at the second location; and in accordance with determining that the attribute is of a second attribute, displaying the updated virtual element away from the second location, wherein the first attribute is different from the second attribute.

18. The method of claim 1, wherein the modality of the virtual element is based on a function of the virtual element.

19. A non-transitory computer-readable storage medium storing program instructions that are computer-executable to perform operations comprising:

providing a view, at a device, the view comprising a virtual element and a physical environment, wherein the virtual element is a first type of modality and is at a first location in the view relative to the physical environment;

detecting a change in the view, the change comprising placement of the virtual element at a second location in the view; and in response to detecting the change in the view based on the placement of the virtual element at the second location:

detecting an attribute of the physical environment at the second location of the virtual element in the view;

selecting a second type of modality of the virtual element based on the detected attribute, wherein the first type of modality comprises a first set of interactive features and the second type of modality comprises a second set of interactive features;

determining, based on the selected second type of modality and the second location of the virtual element in the view, whether to update the virtual element;

in accordance with determining to update the virtual element, updating the virtual element based on the selected type of modality, wherein updating the virtual element comprises:
changing a size, shape, design, or color attribute of the virtual element, and
changing modality-specific functions of the virtual element from the first set of interactive features to the second set of interactive features; and presenting an updated view of the updated virtual element and the physical environment.

20. The non-transitory computer-readable storage medium of claim 19, wherein detecting the attribute comprises detecting whether the second location is a planar surface and wherein selecting the second type of modality of the virtual element based on the detected attribute comprises determining that the planar surface is a wall, table, floor, ramp, stairway, or ceiling.

21. The non-transitory computer-readable storage medium of claim 19, wherein detecting the attribute comprises:
identifying a classification of a portion of the physical environment using a classifier; and
identifying an amount of the portion available upon which the virtual element can be positioned.

22. A system comprising:
an electronic device with a display and an image sensor;
a processor; and
a computer-readable storage medium comprising instructions that upon execution by the processor cause the system to perform operations, the operations comprising:
providing a view comprising a virtual element and a physical environment wherein the virtual element is a first type of modality and is at a first location in the view relative to the physical environment;
detecting a change in the view, the change comprising placement of the virtual element at a second location in the view; and
in response to detecting the change in the view based on the placement of the virtual element at the second location:
detecting an attribute of the physical environment at the second location of the virtual element in the view;
selecting a second type of modality of the virtual element based on the detected attribute, wherein the first type of modality comprises a first set of interactive features and the second type of modality comprises a second set of interactive features;
determining, based on the selected second type of modality and the second location of the virtual element in the view, whether to update the virtual element;
in accordance with determining to update the virtual element, updating the virtual element based on the selected type of modality, wherein updating the virtual element comprises:
changing a size, shape, design, or color attribute of the virtual element, and
changing modality-specific functions of the virtual element from the first set of interactive features to the second set of interactive features; and
presenting an updated view of the updated virtual element and the physical environment.

23. The system of claim 22, wherein detecting the attribute comprises detecting whether the second location is a planar surface and wherein selecting the second type of modality of the virtual element based on the detected attribute comprises determining that the planar surface is a wall, table, floor, ramp, stairway, or ceiling.

24. The system of claim 22, wherein detecting the attribute comprises:
identifying a classification of a portion of the physical environment using a classifier; and
identifying an amount of the portion available upon which the virtual element can be positioned.

\* \* \* \* \*